United States Patent [19]

Hodgson

[11] Patent Number: 4,509,834
[45] Date of Patent: Apr. 9, 1985

[54] POSITIONING APPARATUS FOR POSITIONING A WORKPIECE RELATIVE TO A FRAME OF REFERENCE

[76] Inventor: R. W. Hodgson, 1680 N. Vine St., #204, Hollywood, Calif. 90028

[21] Appl. No.: 361,420

[22] Filed: Mar. 24, 1982

[51] Int. Cl.³ .............................................. G02B 21/24
[52] U.S. Cl. .................................... 350/521; 350/522
[58] Field of Search ............................... 350/521–522, 350/529–533, 507

[56] References Cited

U.S. PATENT DOCUMENTS

| 3,064,529 | 11/1962 | Straat .................................... 350/522 |
| 3,259,012 | 7/1966 | Locquin ............................... 350/521 |
| 3,891,301 | 6/1975 | Heller .................................... 350/522 |
| 4,299,440 | 11/1981 | Hodgson ............................. 350/530 |

FOREIGN PATENT DOCUMENTS

| 2601610 | 7/1977 | Fed. Rep. of Germany ...... 350/522 |
| 3113190 | 1/1982 | Fed. Rep. of Germany ...... 350/507 |

Primary Examiner—William H. Punter

[57] ABSTRACT

Positioning apparatus for positioning a workpiece holder relative to a frame of reference and with the workpiece holder in a preferred form being intended to mount and hold a workpiece comprising an eyepiece and/or objective lens portion of a microscope optical system in a vertical position such as to align an optical axis of the microscope eyepiece and/or objective lens portion vertically with an optical axis of the rest of the microscope optical system which is adapted to be carried by a microscope stand which extends upwardly to the level of the workpiece holder and is effectively attached with respect thereto by an adjustable positioning head having an attachment portion and an adjustably movable coupling portion having a connection part cooperable for connection to the workpiece holder and with the attachment portion and the coupling portion being provided with controllably adjustable relative movement-causing apparatus effectively interconnected therebetween in a manner such as to selectively and controllably cause relative translatory and/or relative rotary movement of the coupling portion with respect to the attachment portion in selected mutually perpendicular directions and planes with respect to an imaginary frame of reference having imaginary mutually perpendicular x, y and z axes, one of which is exactly parallel to and offset from the optical axes of both the upper microscope eyepiece and/or objective lens portion of a microscope optical system and the rest thereof adapted to be carried by a microscope stand.

14 Claims, 19 Drawing Figures

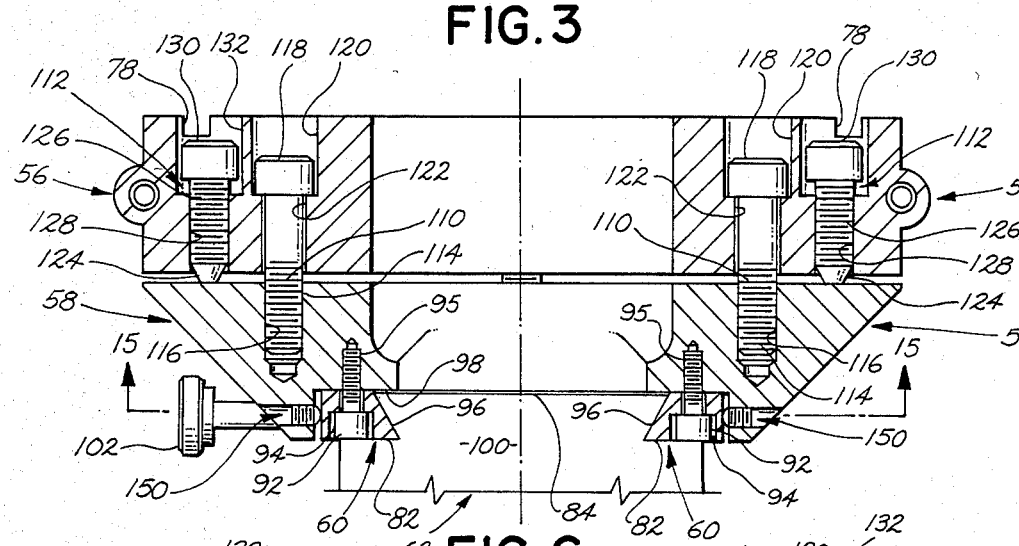
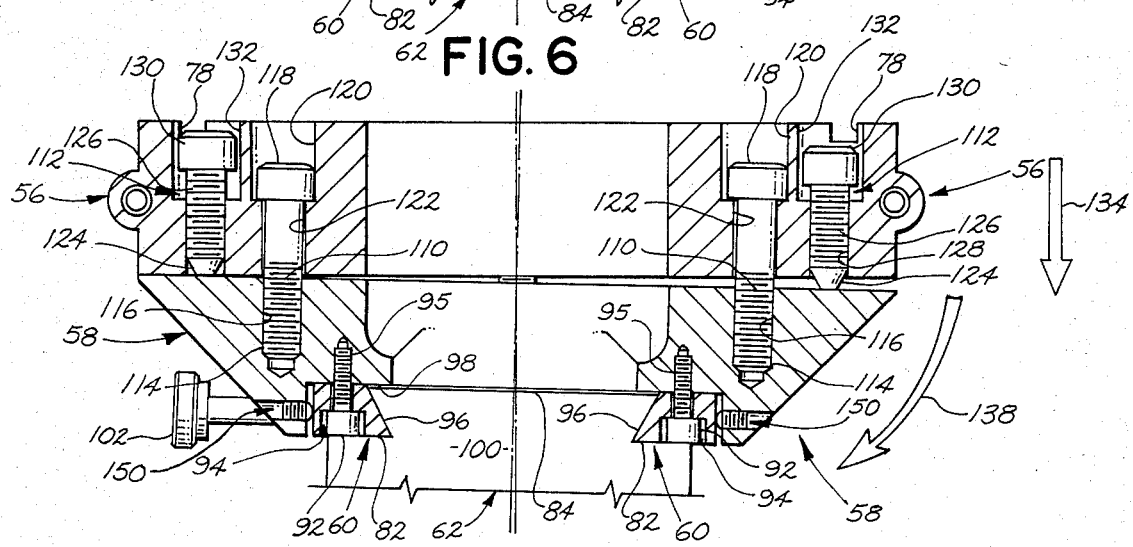
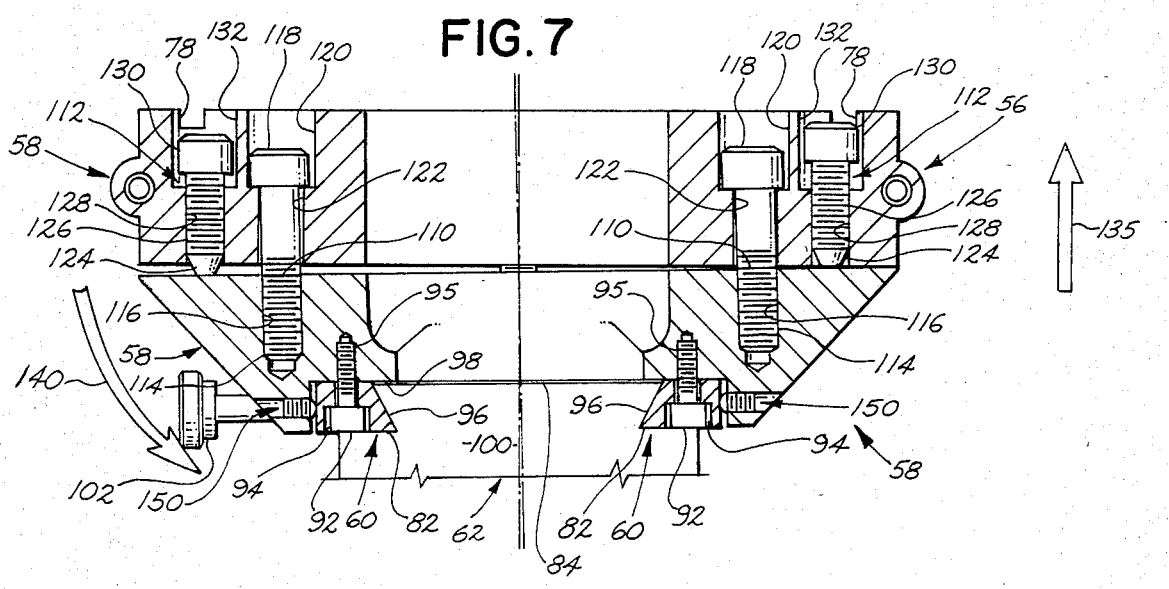

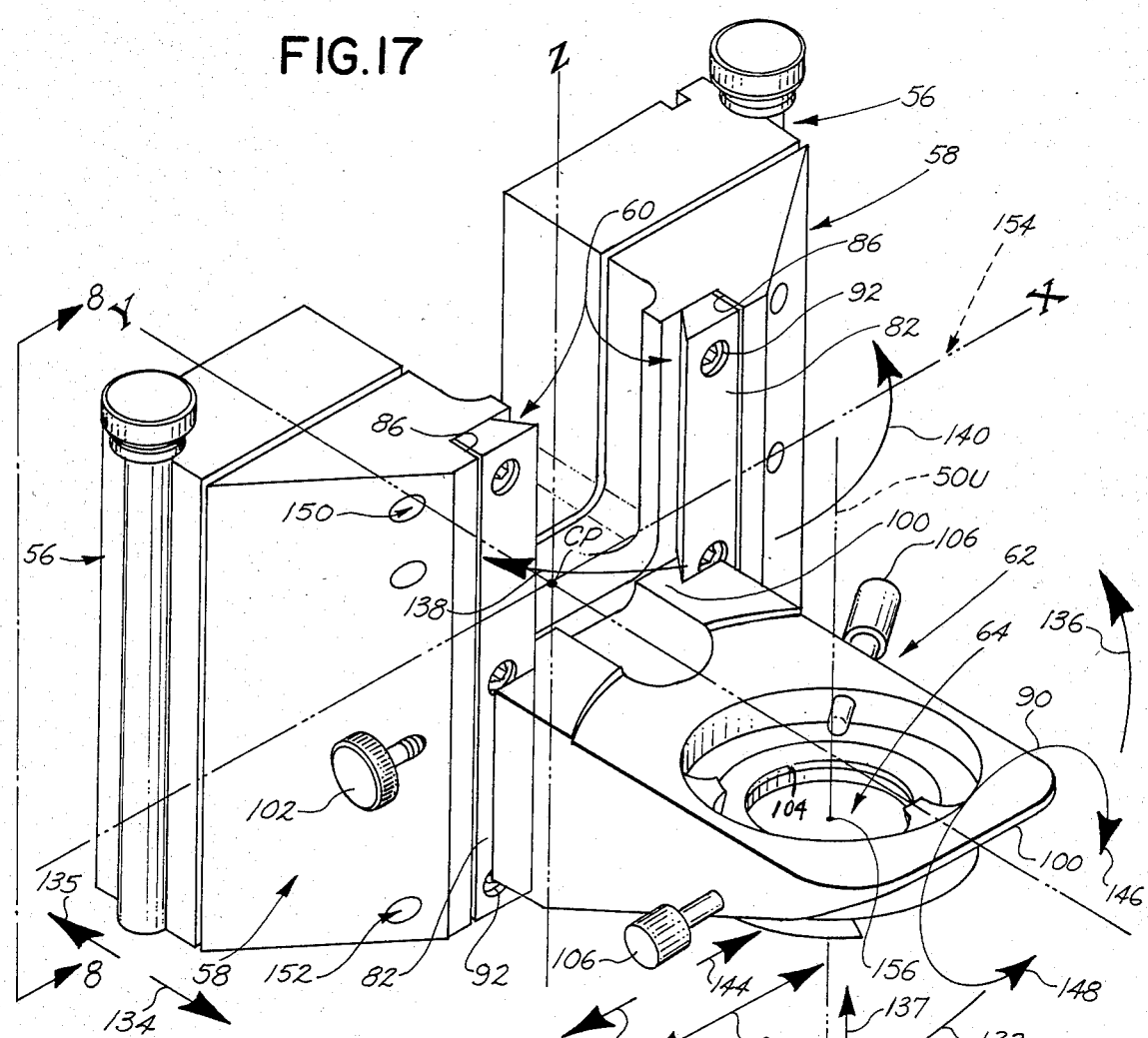
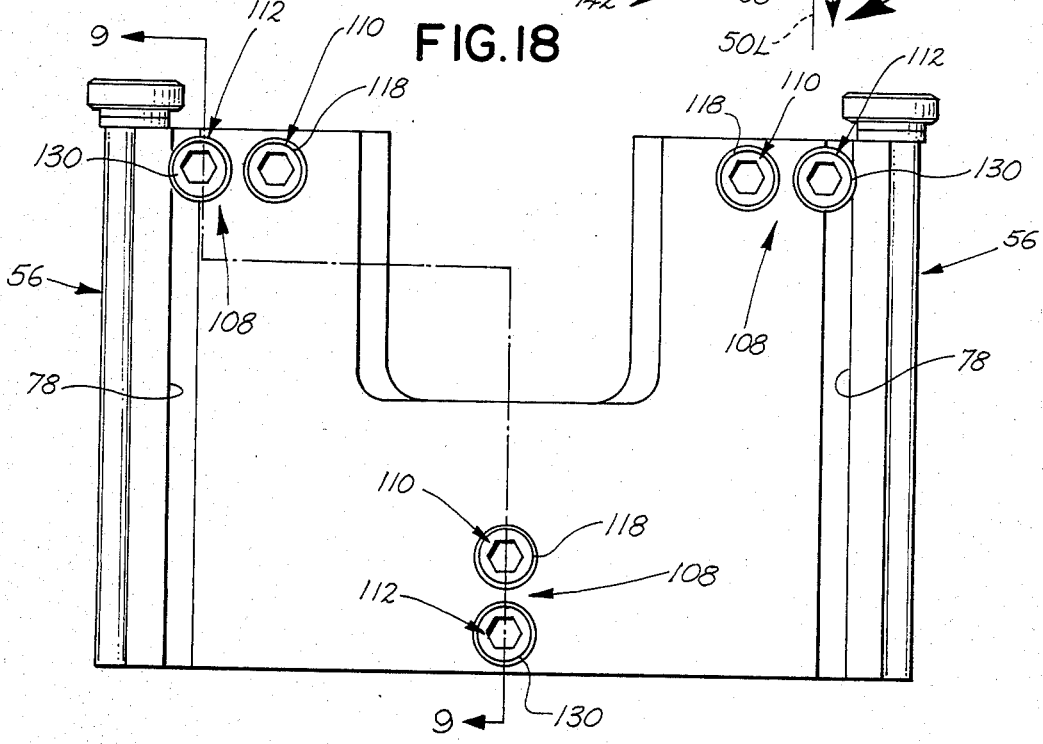

POSITIONING APPARATUS FOR POSITIONING A WORKPIECE RELATIVE TO A FRAME OF REFERENCE

BACKGROUND OF THE INVENTION

The field of the invention is generally that of microscopes and microscope stands and associated equipment and, more particularly, the type of microscope and microscope stand disclosed, described and claimed in great detail in the prior patent application of the inventor of the present invention entitled AN IMPROVED MICROSCOPE STAND FOR MICROSCOPE OPTICS AND A MUTUALLY PERPENDICULARLY ADJUSTABLE WORK STAGE IN AN INTERMEDIATE FOCUSING PLANE, Ser. No. 013,196 filed 02/22/79, and subsequently issued on Nov. 10, 1981 as U.S. Pat. No. 4,299,440, to which reference is made at this point in the present specification and throughout the remainder of this present specification and also when considering the drawings of the present application. In such microscopes and microscope stands, as well as in many other types of microscopes, a major problem has been the proper optical alignment of the microscope optics (comprising one or more portions of a microscope optical system.) Usually, this has required very precise manufacturing procedures for all portions of the microscope stand and all portions thereof which carry various parts of the microscope optical system and has further required very precise and accurate assembly procedures for same. This has had the effect of greatly increasing the cost of manufacture of such a microscope stand, and microscope, when completed in fully-assembled and optically aligned relationship.

It is clear that it would be highly desirable to provide either a microscope stand, or some adjustable positioning head or coupling portion connected to, and effectively comprising a part of the microscope stand, which would be capable of initial engagement with, or retrofitting engagement with respect to, one or more standard sets of microscope optics (usually a number of different makes or varieties of microscope optics), and/or intermediate work stages, which would only need to initially be capable of mounting the so-called workpiece (usually an eyepiece and objective lens portion of the microscope optics, although not specifically so limited) in a close-to-optical-alignment position (which is relatively inexpensive to do from both the manufacturing and the assembly points of view) and then completing the precise optical alignment by adjustment of the above-mentioned adjustable positioning head or coupling portion, and a workpiece holder carried thereby, with respect to an attachment portion thereof rigidly attached to an upper supporting arm of a microscope stand, with said adjusting movement being in selected mutually perpendicular x and y directions when of a translatory type or being in two selected mutually perpendicular vertical planes when being of a rotary type whereby to produce exact coincidence and alignment of the optical axes (or optical axis upper and lower portions) of the movable portions of the microscope optical system—and doing so in a manner which can be accomplished in a few minutes by relatively unskilled help and at very low expense. It is precisely such a highly desirable and advantageous type of adjustable positioning head for a supporting structure (such as a microscope stand) which is provided by and in the present invention and which has advantages of the type referred to above, virtually completely overcoming the problems, disadvantages, and limitations of the above-mentioned type inherent in most prior art microscopes, and microscope stand, constructions, and wherein all of said advantages flow from, and occur by reason of, the specific features of the invention pointed out hereinafter.

SUMMARY OF THE INVENTION

Generally speaking, the positioning and/or aligning apparatus for positioning and aligning a workpiece holder (and a workpiece adapted to be held thereby) relative to an imaginary frame of reference takes the form of an adjustable positioning head including an attachment portion and an adjustably movable coupling portion having connection parts (usually provided with fastening and connection means) cooperable for connection to a workpiece holder. The attachment portion and the coupling portion are provided with controllably adjustable relative movement-causing means effectively interconnected therebetween in a manner such as to make it possible to selectively and controllably cause relative translatory and/or relative rotary movement of the coupling portion with respect to the attachment portion (and, also, with respect to the auxiliary supporting structure rigidly attached to the attachment portion) in either of two different x or y directions relative to an imaginary frame of reference and/or in either of two different rotary planes which are mutually perpendicular and rotate around the x and y axes of an imaginary frame of reference, thus making it possible to adjust the position and angular orientation of the workpiece holder so that a central axis thereof (usually, an upper central axis thereof) will be exactly coincident with and aligned with another (usually a lower) central axis which is parallel to and forwardly offset from a desired imaginary axis (usually the z axis) of said imaginary frame of reference.

In one preferred form, the attachment portion is so constructed as to be attachable to an upper cantilever supporting arm of a microscope stand, while the workpiece holder is so constructed as to be cooperable for firmly mounting and holding a workpiece comprising an initial portion of an optical system, such as an eyepiece portion and an objective lens portion of a microscope optical system, thus providing for easy centering and alignment thereof with respect to remaining portions of the microscope optical system.

Additionally, the invention, in certain preferred forms, includes means for causing (which throughout shall also mean "for allowing") translatory movement of the workpiece holder in a vertical direction parallel to (and usually forwardly offset from) the imaginary z axis of the imaginary frame of reference with respect to the immediately adjacent connection means (or connection means parts), the coupling means carrying same and the attachment means attached to the auxiliary supporting structure (in a preferred form, comprising an upper supporting cantilever arm portion of a microscope stand.) This z axis workpiece holder adjustment provides for vertical adjustment of the upper portion of the microscope optical system (primarily for eye-positioning convenience of an operator of the apparatus) or vertical adjustment of the lower focusing portion of the microscope optical system, and the intermediate stage adapted to carry work which is to be viewed microscoptically, (primarily for handpostioning convenience of an operator of the apparatus).

OBJECTS OF THE INVENTION

With the above points in mind, it is an object of the invention to provide positioning and/or aligning apparatus for positioning and/or aligning a workpiece holder, and a workpiece adapted to be held thereby, relative to a reference axis (in one preferred form, a vertical reference axis) of an auxiliary imaginary frame of reference comprising a coordinate system of x, y and z axes extending mutually perpendicularly to each other through a reference center thereof.

It is a further object of the invention to provide such positioning and/or aligning apparatus as referred to in the preceding object, wherein it includes an adjustable positioning head including an attachment portion and an adjustably movable coupling portion having a connection part (which shall also mean parts) which, in one preferred form, is provided with fastening and connection means cooperable for connection to the workpiece holder, and wherein the attachment portion and the coupling portion are provided with controllably adjustable relative movement-causing means effectively interconnected therebetween in a manner such as to selectively and controllably cause relative translatory and/or relative rotary movement of said coupling portion with respect to said attachment portion, in x and/or y directions for translatory movement, and around at least the x and y axes (in some cases, also around the z axis) in mutually perpendicular planes for rotary movement, whereby to make it possible to position and align a selected portion of, or location relative to, the workpiece holder (usually the center thereof coincident with a longitudinal central axis or axis portion, thereof, although not specifically so limited in all cases) with respect to another workpiece portion longitudinal central axis, or portion thereof, (usually, below the first-mentioned one) which is parallel to, and offset from (usually, forwardly offset from) one of said imaginary reference axes (usually the z axis, although not specifically so limited in all cases) of the imaginary coordinate system comprising the imaginary frame of reference.

It is a further object of the invention to provide apparatus of the character referred to in the preceding object wherein the attachment portion is provided with controllably engagable and disengagable attachment elements cooperable for positive locking engagement and attachment of the attachment portion with respect to an auxiliary supporting structure (which, in one preferred form, comprises an upper supporting arm portion of a microscope stand), and wherein the connection part (which shall also mean parts) is/are provided with fastening and connection means cooperable for fastening cooperation with a rear base or mounting portion of the workpiece holder which, in one preferred form, is adapted to mount a particular type of workpiece comprising an upper eyepiece and/or objective lens portion of a microscope optical system in a vertically-directed rigid manner relative to the microscope stand while providing for selectively controllably adjustable translatory movement of at least two different mutually perpendicular types and in at least four different directions and/or while providing for rotary movement in at least two different mutually perpendicular planes (usually vertical planes) in at least four different directions as required in order to shift the workpiece holder and the microscope optical system portion carried thereby into a position such as to provide perfect vertical alignment of and coincidence of the central vertical optical axis of the microscope optical system portion with the optical axis of the rest of the microscope optical system in a manner parallel to, and offset from, the corresponding imaginary vertical axis of the imaginary coordinate system comprising the imaginary frame of reference; it being understood that said rest of said microscope optical system is carried by the microscope stand which also mounts said attachment portion on an upper supporting arm portion thereof.

It is a further object of the invention to provide apparatus of the character referred to in any or all of the preceding objects, and/or in the balance of the specification, which is of the character referred to at any of said locations, generically and/or specifically, and which may include any or all of the features referred to herein, either individually or in combination, and which is of a type adapted to cooperate with a variety of different forms of conventional microscope optical systems, either at the time of original manufacture or subsequently in what might be termed a retrofitting manner, and which, further, is of relatively simple, reliable, readily portable construction suitable for ready mass manufacturing, production and distribution of the improved position-adjusting and/or alignment-adjusting coupling head, either individually or in combination with the balance of a microscope stand in any of various different forms at reasonable cost, both as to the initial capital cost (including production set-up cost) and as to the subsequent per-unit manufacturing cost whereby to be conductive to relatively widespread production, distribution and use of the novel final positioner of the present invention for any of the purposes outlined herein, or for any substantially equivalent or similar purposes.

Further objects are implicit in the detailed description which follows hereinafter (which is to be considered as exemplary of, but not specifically limiting the present invention), and said objects will be apparent to persons skilled in the art after a careful study of the detailed description which follows.

For the purpose of clarifying the nature of the present invention, the final positioner and aligner rather than the complete microscope stand and microscope, one exemplary embodiment thereof is illustrated in the hereinbelow-described figures of the accompanying six sheets of drawings.

BRIEF DESCRIPTION OF THE DRAWINGS

FIG. 3 is an enlarged top sectional view taken substantially along the plane and in the direction indicated by the arrows 3—3 of FIG. 2.

FIG. 6 is a view similar to FIG. 3, but shows it in one rotary-movement adjusted position.

FIG. 7 is a view similar to FIG. 3, but shows it in an opposite rotary-movement adjusted position from FIG. 6.

FIG. 17 is a larger scale isometric view of just the novel positioner and aligner and workpiece holder of the present invention showing everything in intermediately-adjusted relationship capable of movement in any of the directions separately illustrated in FIGS. 4 through 16 inclusive.

FIG. 18 is a rear elevational view of FIG. 17.

DESCRIPTION OF THE PREFERRED EMBODIMENT

The present invention relates primarily to the novel positioning and/or aligning apparatus previously referred to in general terms, but in order to properly illustrate it in use and to properly understand its great advantages, it appears desirable to show it in conjunction with at least one exemplary type of auxiliary supporting structure and in conjunction with at least one exemplary type of workpiece adapted to be held by the workpiece holder in the novel easily-adjustable manner whereby to make it possible to quickly and easily adjust the position of the workpiece and a central axis portion thereof into a desired relationship with respect to a corresponding axis of a frame of reference usually comprising three mutually perpendicular axes (usually x, y and z axes intersecting at an imaginary center point), which will align said central axis portion with another workpiece portion central axis portion.

Figure 1:
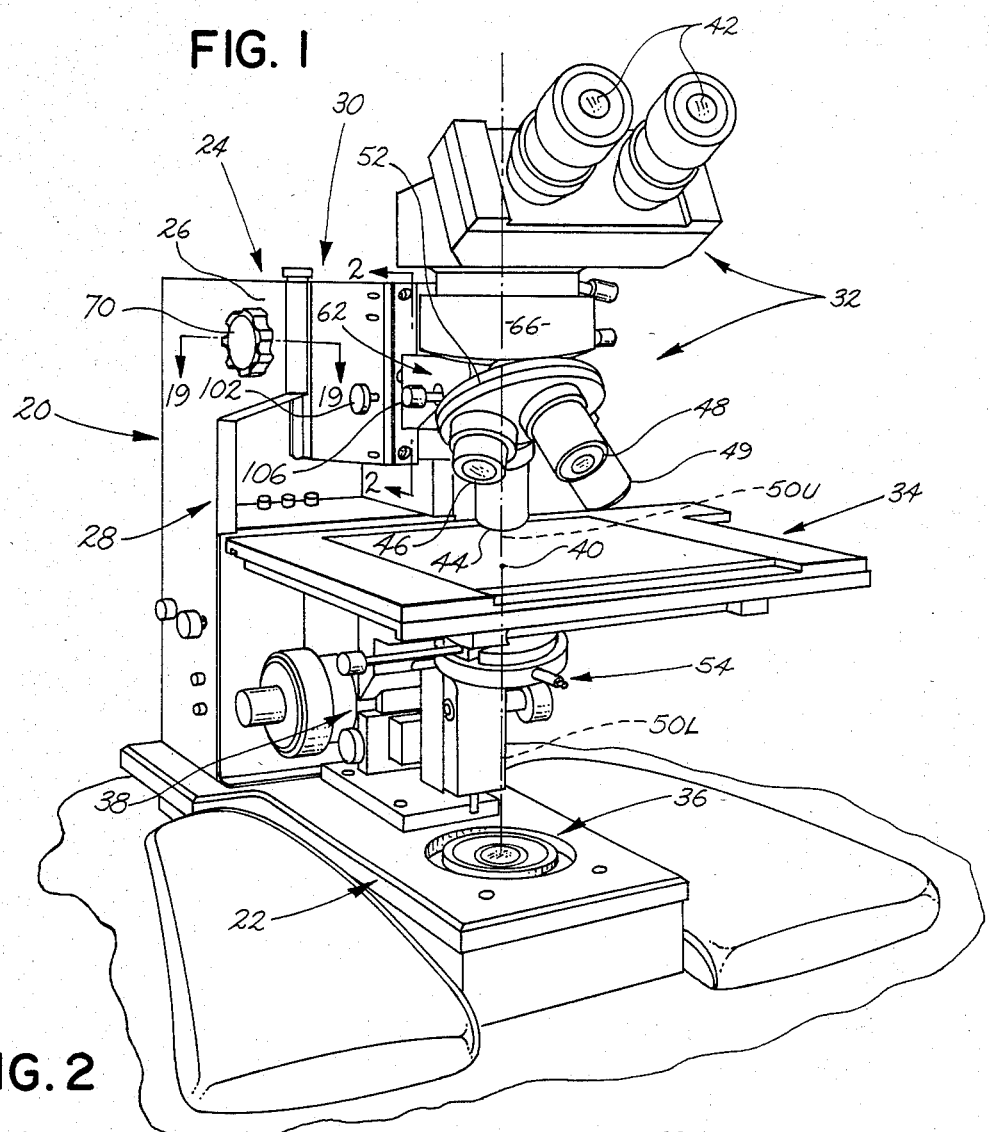
FIG. 1 is a three-dimensional, pictorial, isometric view showing one illustrative embodiment of the position-adjusting and/or alignment-adjusting positioning head of the present invention in attached relationship with respect to one particular exemplary type of auxiliary supporting structure, which is shown as taking the exemplary form of a substantially horizontally-directed upper cantilever supporting arm portion of a microscope stand, and which also shows the novel positioning head of the present invention selectively movably coupled and connected to a workpiece holder (a mounting ring) which is shown for exemplary purposes as mounting a particular type of workpiece comprising the upper eyepiece and/or objective lens portion and one exemplary form of microscope optical system, with the remainder of the microscope optical system being carried by the rest of the microscope stand in the manner illustrated in fully-assembled relationship in FIG. 1 and also similar to that disclosed in the prior application of the present inventor, Ser. No. 013,196, filed 02/22/79, with an issue date of 11/10/81, as U.S. Pat. No. 4,299,440, to which reference is made here, and throughout this specification and claims, as to the details of structure and operation of the microscope stand and microscope, as distinguished from the real inventive concept of the present invention, which is directed to the final positioning and aligning head adjustable interconnected between the microscope stand and the microscope optics.
Figure 2:
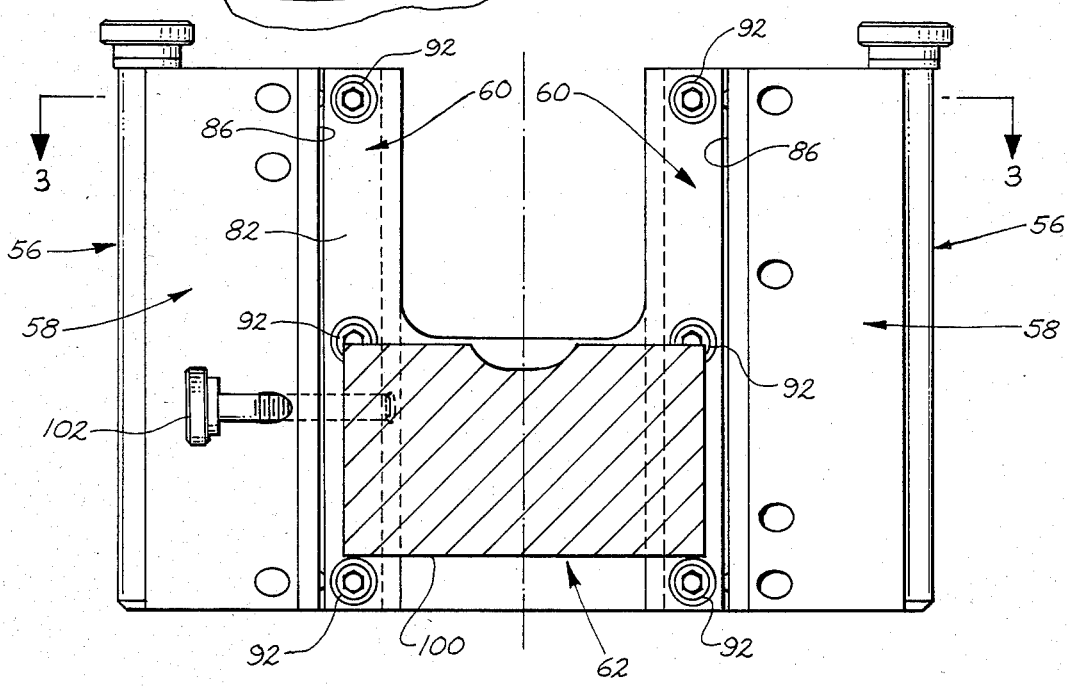
FIG. 2 is an enlarged view (enlarged relative to the scale of FIG. 1) of the novel positioning and aligning head of the present invention, (without the rest of the apparatus of FIG. 1,) taken substantially along the plane and in the direction indicated by the arrows 2—2 of FIG. 1.

In the exemplary form illustrated, the auxiliary supporting structure comprises a microscope stand, such as is generally designated by the reference numeral 20, which is shown as having a lower bottom or base portion 22, an upwardly spaced supporting arm structure 24 (actually a pair of laterally-spaced cantilever arms similar to the exemplary near one shown at 26 in FIG. 1) interconnected by a hollow upstanding intermediate post portion, indicated at 28, whereby it may be said that the entire auxiliary supporting structure or microscope stand 20 is of extremely rigid substantially C-shaped configuratiion generally similar to that illustrated in the prior application of the present inventor, Ser. No. 013,196, filed 02/22/79 and with an issue date of 11/10/81 as U.S. Pat. No. 4,299,440, to which reference is made here, and throughout this specification and claims, as to the details of structure and operation of the microscope stand and microscope, as distinguished from the real inventive concept of the present invention, which is directed to the final positioning and aligning head, generally indicated by the reference numeral 30, which is adjustably interconnected between the microscope stand and the upper portion of the microscope optics indicated generally at 32, which, in the example illustrated, comprises one exemplary form of the previously-mentioned workpiece. Indeed, for the record, the inventor of the present invention specifically includes and incorporates herein (by reference), all of the structural details of the microscope stand and microscope disclosed in said prior application of the present inventor as fully as if all of the drawings thereof and all of the written description of said drawings were included in detail in the present application (which is not done in full detail at the present time in order to avoid unnecessarily lengthening this present application and in view of the obvious redundancy involved in so doing, because of the full disclosure of the details of said microscope stand and microscope contained in said hereinbefore-identified prior application of the present inventor).

For purposes of the present invention, directed primarily to the positioning and aligning head indicated generally at 30, a controllably adjustable intermediate work stage, such as is indicated generally at 34, and a lower illuminator means, such as is indicated generally at 36, will be considered as, and referred to as, lower parts of (or a lower portion of) the microscope optical system, of which the upper initial eyepiece-including and objective lens-including portion is indicated generally at 32. There is also a lower focusing mechanism, indicated generally at 38, which adjusts the position of the intermediate and centrally transparent work stage 34 so as to be horizontally coincident with a proper focusing plane for the microscope.

Additionally, the focusing structure mounting the intermediate work stage 34 is also provided with means for causing horizontal x or y movement of the transparent plate 40 of the intermediate work stage 34 so that any desired portion thereof can be moved under the vertical central optical axis of the microscope optics of the complete microscope apparatus for binocular viewing thereof by a user of the microscope looking through the binocular eyepieces 42 and any selected one of the aligned lower objective lens systems, such as are shown a 44, 46, 48, and 49, respectively, and which are carried by, and are effectively comprised by, a lower rotary turret 52. The means for causing the above-mentioned x and y movement of the intermediate work stage 34 comprise a double set of operating knobs and appropriate gearing in the general location indicated at 54. All of the above-mentioned features 32, 34, 36, 38, 40, 42, 44, 46, 48, 50, 52, and 54 are similar to the corresponding structures illustrated and described in detail in the hereinbefore-identified prior application of the present inventor and therefore, in effect, have been, and are fully-disclosed to an entirely adequate extent in the present specification drawings, wherein said elements are only incidental to the primary inventive concept of the present invention directed to the novel positioning and aligning head, indicated generally at 30.

It should be noted that it is very important that the upper optical axis portion, indicated at 50U of the upper optical system portion 32 be in perfect vertical alignment with a lower optical axis portion 50L of the rest of (the lower portions of) the optical system 34 and 36 so as form (together) a line of collimation extending directly through the center of the viewing portion of the transparent surface of the work stage 40 and the underlying illuminator 36 directing upwardly transmitted light (usually collimated), and this requires the proper positioning of the selected objective lens 44 and of the entire turret 52 and eyepieces 42 relative to the vertical z axis of an imaginary frame of reerence best shown at 154 in FIG. 17. Normally, in prior microscopes and microscope stands, this has been difficult to achieve, and has required great precision in the manufacturing and assembling methods employed.

In the case of the present invention, the lower illuminator 36 is usually in a substantially fixed position, while the work stage 34 can be both focused by moving it upwardly or downwardly by the focusing mechanism means 38, and can also be adjusted horizontally in x and y directions, as indicated at 54, to place a desired viewable object exactly on a line of collimation corresponding to 50L. Thus the only portion of the optical system requiring adjustment is the upper portion thereof, as indicated generally at 32, which can be adjusted easily to the exact position required for such alignment of 50U and 50L by the novel positioning and aligning head 30 with much less manufacturing and assembling precision being required than in prior art constructions.

The description which follows is primarily directed to the positioning and aligning head (and workpiece holder), per se, with reference to the other portions of the complete apparatus shown in FIG. 1 being only as needed in order to understand the construction and operation of the positioning and aligning head 30.

The positioning and aligning head 30 includes a rear attachment portion 56 and an adjustably movable coupling portion 58 having a connection portion, or connection parts, indicated at 60 cooperable for connection to a workpiece holder, indicated generally at 62, which, in turn, is adapted to mount a workpiece comprising, in the non-limiting example illustrated, the upper or initial portion of a microscope optical system designated at 32 and including eyepieces 42 and selectable, turret-mounted, objective lenses 44, 46, 48, and 49. In the example illustrated, the mounting of the initial microscope optical system portion 32 is accompanied by passing a portion thereof through a central aperture 64, with the rotary turret 52 being hung on the structure therebelow and with an enlarged locking abutment ring 66 being positioned immediately above the apertured workpiece holder 62. However, it should be understood that this cooperative mounting structure and relationship is applicable to the particular optical system input portion employed. Various other types of microscope optical systems' input portions can also be mounted by the same, or slightly modified, workpiece holders 62 and the structure, in each case, would appear different from that shown in FIG. 1. However, in each case, the rear end of the workpiece holder, where it attaches to the connection portion or connection parts 60, will be substantially the same and in each case, there will be a central optical axis 50U passing centrally and vertically through an aperture equivalent to that shown at 64 in FIG. 17.

Figure 19:
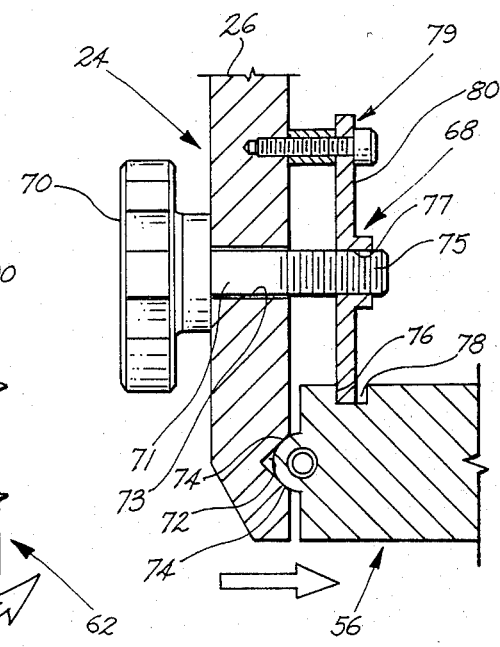
FIG. 19 is an enlarged fragmentary sectional view taken substantially along the plane and in the direction indicated by the arrows 19—19 of FIG. 1 and shows one exemplary type of controllably engagable and disengagable attachment elements which are cooperable for manually-controlled position-locking engagement and attachment of the rear attachment portion of the novel positioning and aligning head of the present invention with respect to an auxiliary supporting structure which, in the example illustrated takes the form of a substantially horizontally directed upper cantilever supporting arm portion of the microscope stand.

In the example illustrated, the rear-positioning attachment portion 56 is adapted to be positively firmly fastened to the auxiliary supporting structure 20 and, in the example illustrated, taking the form of the substantially horizontally-directed upper cantilever supporting arm portion 24 of the microscope stand 20 (said arm portion 24 actually comprising a pair of similar arms 26 laterally spaced apart just slightly in excess of the transverse dimension of the attachment portion 56 so it can be moved into a position with opposite side edges of the attachment portion 56 lying just inside of each of the two arms 26, as is best shown with respect to one of same in FIG. 19). When each side edge of the rear attachment portion 56 is positioned inside of the corresponding upper cantilever arm portion 26 of the microscope stand 20 in a manner similar to the showing of the left set of the engaged parts illustrated in FIG. 19, controllably engagable and disengagable attachment elements, indicated at 68, whereby to produce positive locking engagement and attachment of the attachment portion 56 with respect to the auxiliary supporting structure by way of the upper arms 26 of the microscope stand 20 in the non-limiting example illustrated (best shown fragmentarily in FIG. 19 with the understanding that the oppositely-positioned other-side engagement elements, similar to those shown at 68 in FIG. 19 are the same, but merely positionally reversed).

In the example illustrated with respect to one of the two similar laterally-spaced upper supporting arms 26 of the microscope stand 20 (the other being merely positionally reversed), a manually rotatable locking knob 70 is positioned on the outside of each supporting arm part 26 and has a shaft portion 71 (which is shown as being unthreaded) passing through a slightly larger hole 73 in the supporting arm part 26 so as to allow an inner threaded end part 75 thereof to be threadedly engaged with an interiorly threaded hole or aperture 77 carried by a cantilever locking lever 80, which has a rear end thereof firmly attached by threaded fastener means 79 to an inside portion of the supporting arm part 26 spaced inwardly a short distance from the unthreaded hole 73 and supporting the entire lever 80 in a resiliently mounted cantilever manner with a front end and front locking vane 76 positioned in a corresponding vertical recess or groove 78 provided in the back surface of the rear attachment portion 56 at a similar location at each side thereof for similar cooperation with two such cantilever levers 80 attached, respectively, to each of the two supporting arm parts 26 and forcibly movable in each case by rotation of the corresponding one of the two similar knobs 70. When such rotation occurs, a front end of the corresponding arm part 26 will be forcibly relatively moved inwardly toward the corresponding side edge of the rear attachment portion 56, whereby to force the V-shaped locking groove 72 of the supporting arm portion 26 inwardly against the vertical semi-cylindrical locking ridge or rib 74. This will happen at each side of the rear attachment portion 56 and will firmly lock the rear attachment portion 56 with respect to the upper cantilever supporting arm portion 24 (including the two arm parts 26) of the microscope stand 20 until such time as the two knobs 70 are relatively rotated in the opposite direction for disengagement of the entire multiple attachment element structure just described and best shown, with respect to one of the two similar cooperative assemblies thereof, each similar to the one shown in FIG. 19.

The previously-mentioned connection parts carried by the coupling portion 58 and indicated generally at 60 (see FIG. 17 for example) are shown in one exemplary but non-specifically limiting form wherein two vertically-directed dovetail edge members 82 are vertically mounted within a rectangular recess formed in the central front surface of the coupling portion 58 and indicated at 84. Each of the two dovetail vertical side members 82 is of substantially the same front-to-back thickness as the front-to-back depth of the recess 84 in the front surface of the coupling portion 58 and is adapted to be received adjacent to, but slightly inwardly spaced from, the inward facing edge shoulder surfaces 86 of the coupling portion 58 and to be movably mounted at said location for movement in a lateral vertical plane; either translatory movement in the direction of the two-headed arrow 88 or rotary movement in the direction of the two-headed arrow 90 around the imaginary y axis of an imaginary coordinate frame of reference 154 comprising three mutually-perpendicular axes such as are indicated at x, y, and z. This mounting of the dovetail vertical side-positioned members 82, in the example illustrated is provided by the use of three pairs of equally vertically spaced mounting screws, each indicated by the reference numeral 92 and each extending in a front-to-rear direction in a corresponding oversized hole 94 in the connection part edge member 82 into firmly attached threaded engagement with a corresponding part of the coupling portion 58 positioned immediately therebehind, as indicated at 95. It is clear that if the six attachment screws 92 are slightly loosened, it is possible to laterally shift the connection part edge dovetail strips 82 from side to side in the direction of the double-headed arrow 88 after which movement, they may be locked firmly in place to the coupling portion 58 by merely tightening the connection screws 92. It should also be quite obvious that it is possible to rotate said dovetail members 82 around the y axis by oppositely shifting top and bottom portions thereof and/or to combineeither direction of rotation thereof around the y axis as indicated by the double-headed arrow 90 with either direction of translatory movement as indicated by the double-headed arrow 88, by corresponding translatory movement of central portions of the two vertical connection members 82, and irrespective of which direction the top ends thereof are moved, and which (opposite) direction the bottoms thereof are moved, before said dovetail connection edge members 82 are locked in place by tightening the fastening screws 92.

The inner edges of each of the above-mentioned vertical connection part members 82 are undercut by the provision of inner angular surfaces 96 which, in conjunction with the adjacent front surface 98 of the recess 84, form what might be termed dovetail undercut groove fastening and connection means which are cooperable for fastening cooperation with a corresponding edge-tapered dovetail-cooperable fastening element 100 at the rear or base of a workpiece holder indicated generally at 62. In other words, the arrangement is such that the dovetail fastening element 100 at the rear of the workpiece holder 62 may be slidably moved downwardly (or, in certain cases, upwardly) into the dovetail undercut groove fastening and connection means 96 defined between the two connection edge members 82 into a selected relative vertical relationship where it may be locked by rotation of the locking knob 102 which threadedly extends laterally through one of the two shoulder parts 86 of the coupling portion 58 which define the centrally-positioned rectangular recess 84. This allows the front shaft end of the threaded locking knob 102 to laterally abut a side portion of the base part of the workpiece holder 62 whereby to firmly lock it in any selected vertical position. Thus, the threaded shaft and knob indicated at 102 may be said to comprise one exemplary form of locking means for rigidifying and locking the workpiece holder 62 in firmly non-movably mounted relationship with respect to the connection parts 60.

In the example illustrated, the workpiece holder 62 takes a particular exemplary form where, in addition to the rear dovetail fastening element 100, it includes a forwardly positioned substantially annular ring-shaped portion taking the form of an outer ring member 104, defining a central receiving recess 64 extending downwardly therethrough and which is adapted to receive and mount a workpiece in a vertically directed manner positioned in and received through the recess 64, such as the microscope optical system initial portion indicated generally at 32 in FIG. 1, so that the upper central optical axis 50U, thereof as indicated in FIG. 1, will be exactly coincident with and in alignment with the lower optical axis 50L of the rest of the optical system as indicated at 34 and 36 in FIG. 1.

In the example illustrated, the workpiece holder 62 is further provided with locking means for locking engagement with respect to an exterior portion of the vertically-directed longitudinal workpiece comprising, in the example illustrated in FIG. 1, the initial portion of a microscope optical system. In the example illustrated, said locking means takes the form of locking screws 106, but may be substantially modified in various alternate types of workpiece holders intended for holding and mounting cooperation with respect to various different microscope optical system inputs.

The attachment portion 56 and the coupling portion 58 are provided with controllably adjustable relative movement-causing means effectively interconnected therebetween in a manner such as to selectively and controllably cause relative translatory and/or relative rotary movement (usually both) of the coupling portion 58 with respect to the attachment portion 56 and in selected fore and aft directions in what might be termed a y axis direction, or, in the case of rotary movement, in a vertical plane lying parallel to the y and z axis plane (or coplanar therewith.) In the example illustrated, said movement-causing means comprises a plurality of spaced translatory movement-causing means which, in the example illustrated, are spaced apart laterally and vertically so as to lie at three different locations, probably best shown in FIG. 18 at 108 in each case. It will be noted that each of the three sets of translatory movement-causing means 108 takes the form of a pair of effectively force-opposing translatory movement-causing members 110 and 112, in each case, coupled in opposition between the attachment portion 56 and the coupling portion 58 in a manner such as to apply translatory force in opposite directions to the part of the coupling portion 58 connected thereto for both translatory adjusting purposes and final adjusted-position-locking purposes. For example, each of the translatory-movement-causing members 110 comprises a tension or pulling member having a forward exteriorly threaded portion 114 engaged with an interiorly threaded recess 116 in the rear of the coupling portion 58 and also having an enlarged rear head 118 lying in an enlarged recess 120 and connected by a slightly oversized unthreaded hole 122 to the interiorly threaded recess 116. This means that when the screw head 118 (usually a socketed Allen Wrench type of screw head) is rotated in a threadedly advancing manner relative to the coupling portion 58, it causes the coupling portion 58 to be drawn closer to the front face of the rear attachment portion 56 in the manner best shown in FIGS. 5, and 10, and into firm abutment with the forward ends 124 of each of compression or pusher translatory movement elements 112 which, in each case, comprise a threaded screw shaft 126 engaged within an interiorly-threaded hole 128 in the rear attachment portion 56 and having a rear operating head 130 lying in an oversized recess 132 in the rear surface of the rear attachment portion 56. Thus, it will be understood that forward advancement of any of the pusher screws 112 will force the front abutment end 124 thereof into firm engagement with the rear surface of the coupling portion 58. If this occurs when the puller screws 110 have been adjusted to a desired location, the opposition of each pair of puller and pusher screws 110 and 112 will operate to lock the front coupling portion 58 in that particular desired relationship to the rear attachment portion 56.

Figure 4:
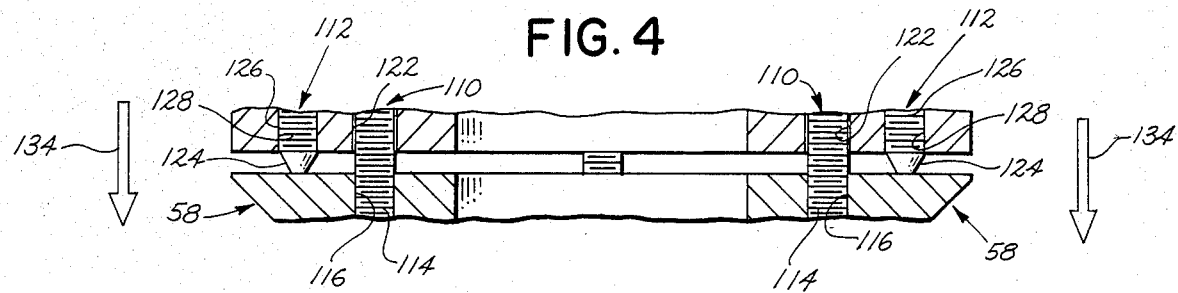
FIG. 4 is a fragmentary view similar to FIG. 3, but shows it in an extended translatory-movement adjusted position.
Figure 9:
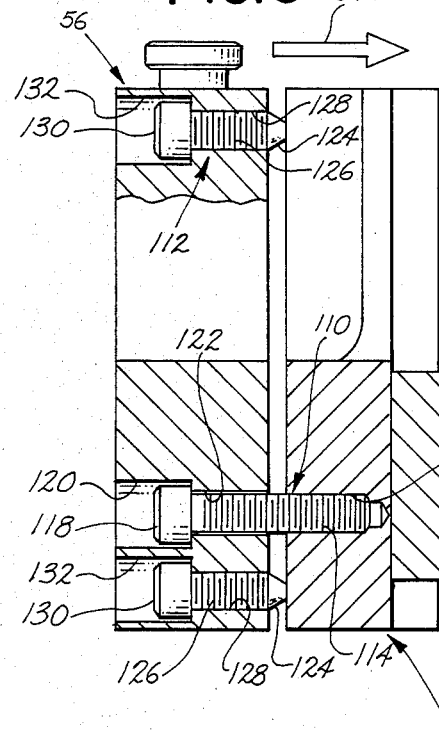
FIG. 9 is a view taken on a staggered plane, as indicated by the arrows 9—9 of FIG. 18, but further shows it in the extended translatory-movement adjusted relationship of FIG. 4.

On the other hand, if the puller screws 110 are loosened to any desired degree, that will allow further forward movement of the pusher screws 112 to relatively move the coupling portion 58 forwardly or away from the rear attachment portion 56 in a manner best shown in FIGS. 4 and 9.

Figure 11:
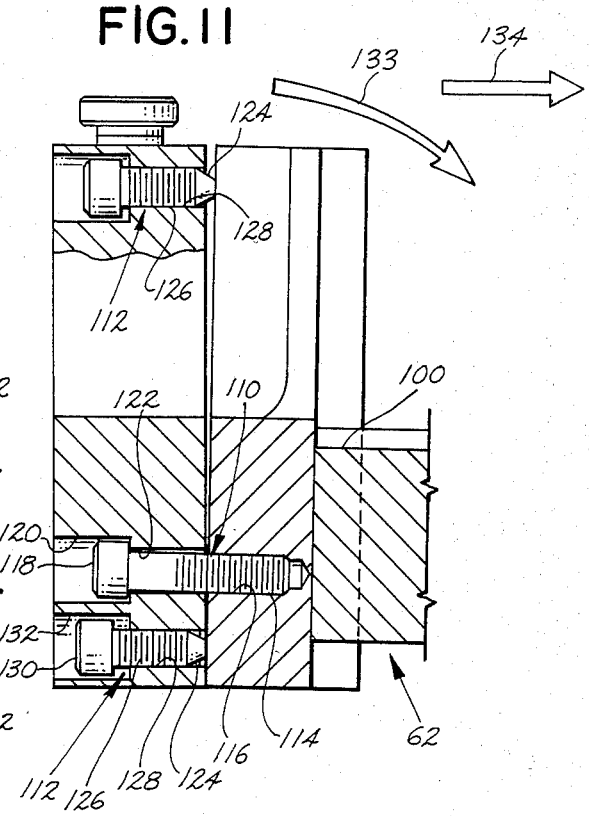
FIG. 11 is a view similar to FIG. 8 but illustrates the head in one type of rotary-movement adjusted relationship.
Figure 12:
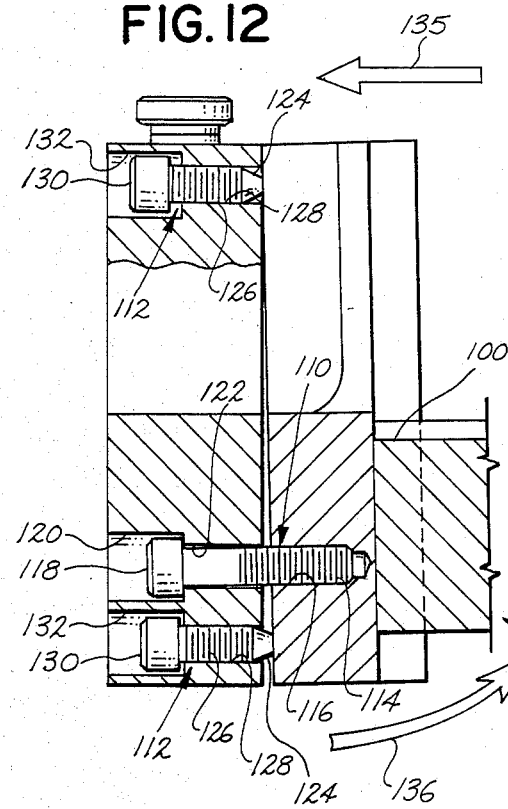
FIG. 12 is a view similar to FIG. 11, but illustrates the head in the opposite direction of rotary-movement adjusted relationship from that of FIG. 11—both in a vertical plane transverse to the rotary adjustment plane of FIGS. 6 and 7.

All of the above movements are translatory. However, all that is necessary in order to convert same to rotary movement is to differentially operate each pair of translatory movement-causing members 108, such as is shown in FIG. 11, where the top puller screw 110 has been loosened and the top pusher screw 112 has been forwardly extended while the bottom pusher screw 112 has been loosened and the bottom puller screw 110 has been tightened. This produces rotary movement in the direction of the single-headed directional arrow 133 as shown in FIG. 11, while the opposite type of rotary directional movement 136, as shown in FIG. 12, is produced by exactly reversing the above-described differential operation of top and bottom sets of translatory movement-causing member 108 (pairs of screws 110 and 112).

It is also possible to produce rotary movement in a horizontal plane as indicated by the directional arrow 138 in FIG. 6 or the directional arrow 140 in FIG. 7 by causing the same type of differential pusher and puller screw operation (112 and 110) at each side of the assembly of rear attachment portion 56 and front coupling portion 58 in the manner clearly shown in FIGS. 6 and 7.

Figure 13:
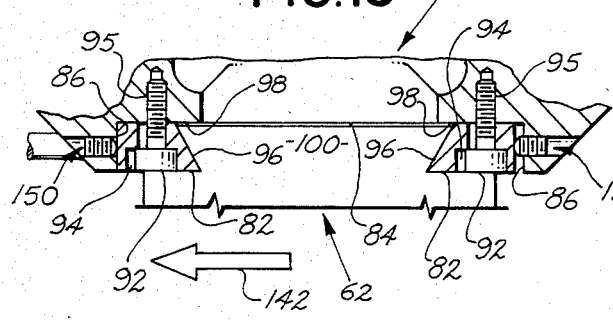
FIG. 13 is a fragmentary view similar to the front portion (showing the connection parts) of FIG. 3, but illustrates same in leftwardly-directed translatory-movement adjusted relationship.
Figure 14:
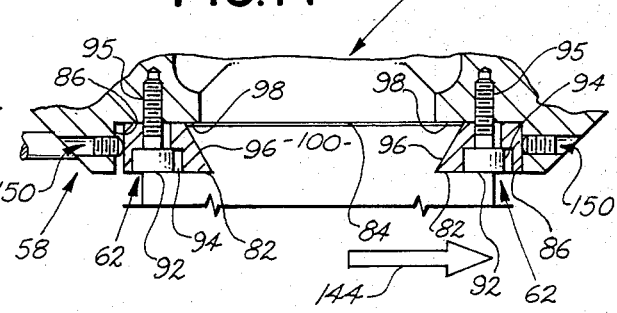
FIG. 14 is a fragmentary view similar to the front portion (showing the connection parts) of FIG. 3, but illustrates same in rightwardly directed translatory-movement adjusted relationship.
Figure 8:
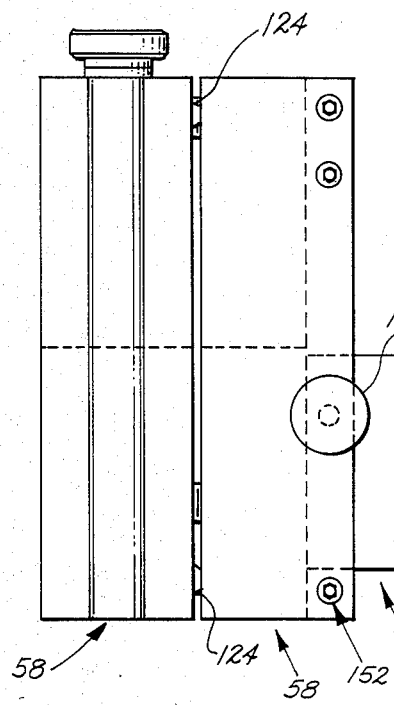
FIG. 8 is a fragmentary left side elevational view of the positioner and aligner of the present invention as seen in the direction of the arrows 8—8 of FIG. 17.
Figure 15:
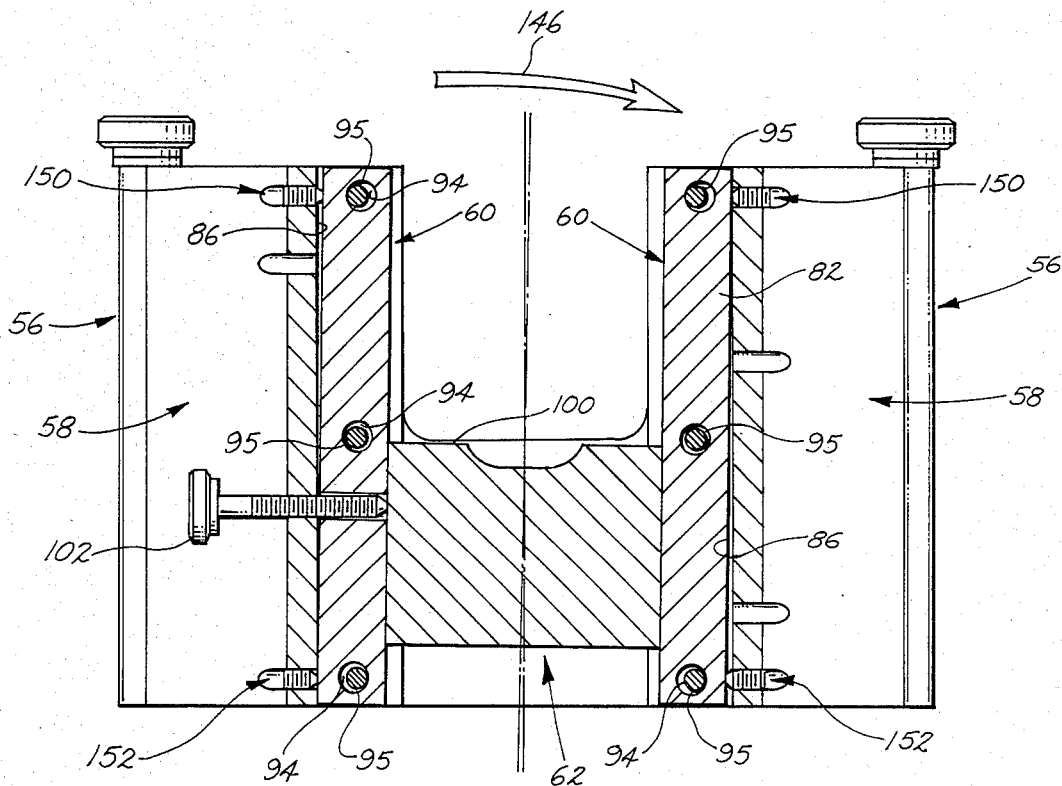
FIG. 15 is a front view, partly in elevation and partly in section, taken substantially along the plane and in the direction indicated by the arrows 15—15 of FIG. 3. However, in this particular view, the front connection parts are shown in rotary-movement adjusted relationship in a vertical plane perpendicular to the plane of rotary movement shown in FIGS. 11 and 12.
Figure 16:
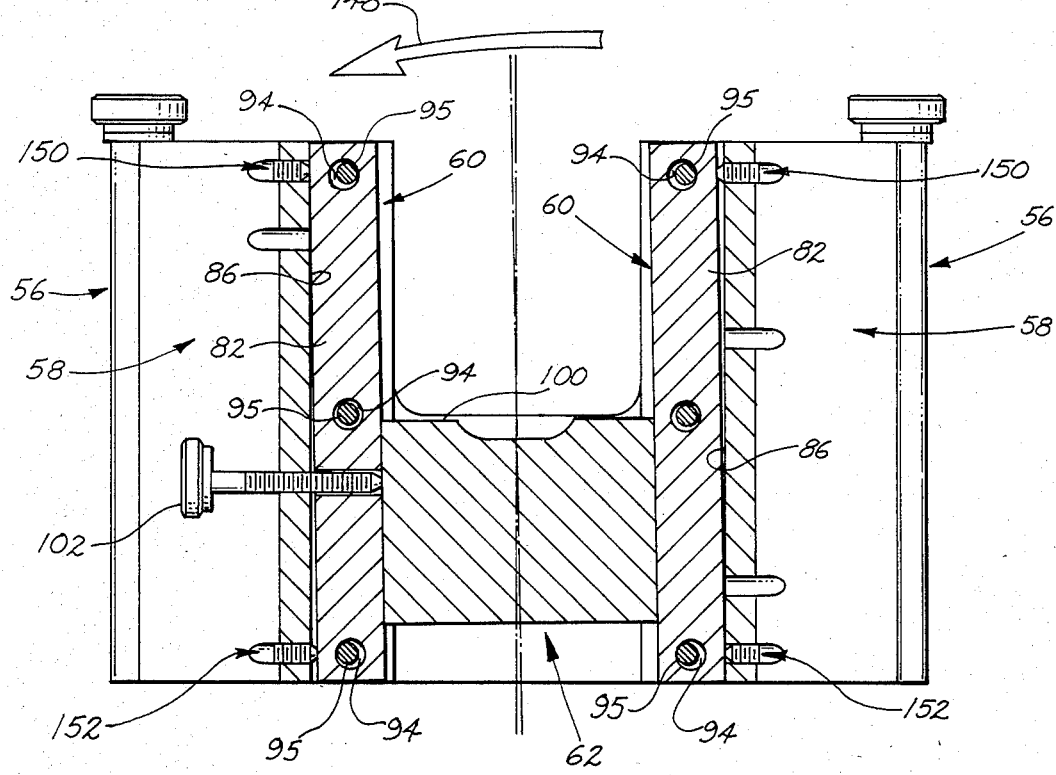
FIG. 16 is a view similar to FIG. 15, but illustrates the opposite direction of rotary-movement of the connection parts from that shown in FIG. 15, but lying in the same vertical plane.

The previously-mentioned mounting front screws 92 positioned in laterally oversized or slotted holes 94 in each of the front dovetail connection members 82 may also be said to comprise part of the previously-mentioned movement-causing means adapted to produce direct lateral leftward movement thereof in a manner such as is shown by the directional arrow 142 in FIG. 13 or direct rightward movement thereof in the manner of the directional arrow 144 shown in FIG. 14, in each case, being translatory movement in a horizontal plane such as the x y plane of an imaginary coordinate frame of reference, while rotary movement thereof in one vertical plane clockwise direction as indicated by the directional arrow 146 in FIG. 15 or in the opposite rotary direction, indicated by the directional arrow 148 in FIG. 16, is permitted by either lateral adjustment of upper pairs of translatory-opposed movement causing screws 150 or lower pairs thereof as indicated at 152 and which, in each paired case, threadedly extend laterally and inwardly through corresponding front shoulder parts of the coupling portion 58 into opposed side abutment with top and bottom side edge portions of the two dovetail connection member portions 82, as is shown in FIGS. 13 and 14, for lateral translatory movement and in FIGS. 15 and 16 for lateral vertical plane rotary movement. In each case, each pair of opposed threaded screws 150 and/or 152 are functionally equivalent to each pair of previously-described opposed screws 110 and 112 connected in fore and aft directions between the attachment portion 56 and the coupling portion 58.

For convenience in describing the various types of position-adjusting movement of the coupling portion 58 relative to the attachment portion 56 and the further relative movement of the connection parts 60 relative to both the attachment portion 56 and the coupling portion 58, an arbitrary imaginary frame of reference has been selected and is shown in broken lines in FIG. 17 and is designated by the reference numeral 154 and includes an imaginary y axis, an imaginary x axis and an imaginary z axis, all of which are mutually perpendicular and pass through an imaginary reference center point CP.

Figure 5:
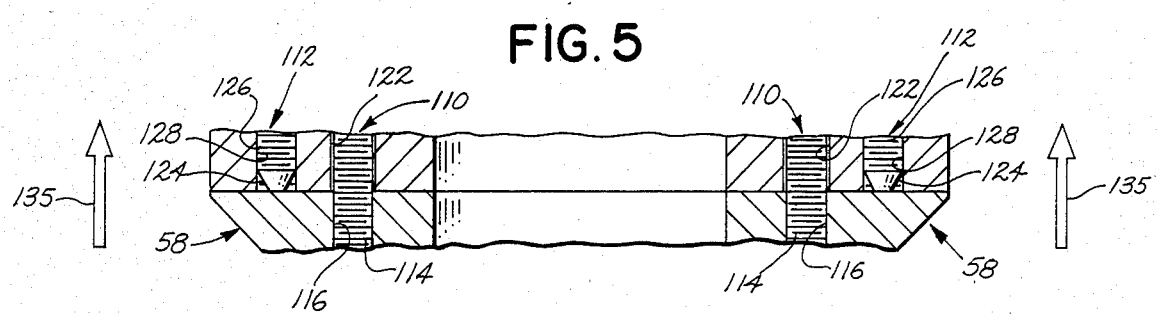
FIG. 5 is a fragmentary view similar to FIG. 3, but shows it in a retracted translatory-movement adjusted position.
Figure 10:
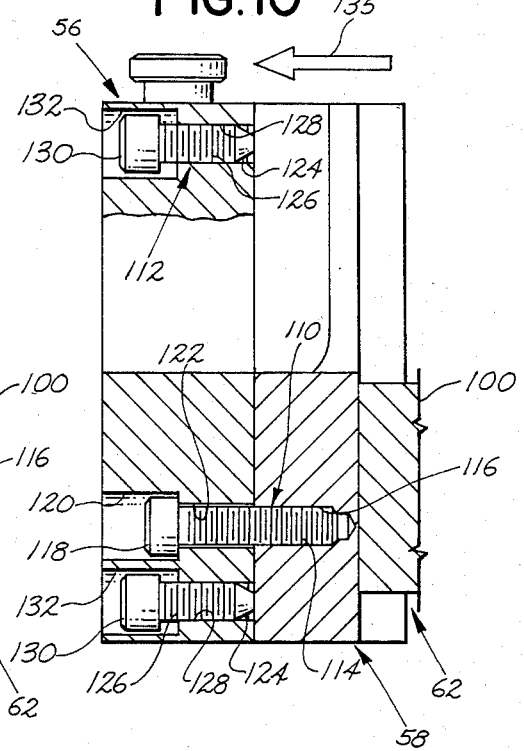
FIG. 10 is a view similar to FIG. 9, but illustrates the positioning and aligning head in the retracted translatory-movement adjusted position of FIG. 5.

It should be noted that the type of forward and rearward translatory movement shown by the directional arrows 134 in FIGS. 4 and 9 and 135 in FIGS. 5 and 10 are movements which may be said to lie in the x y plane and to be in the y direction along the y axis in either a + or − sense. It should also be noted that the other two types of lateral translatory movement shown by the directional arrows 142 in FIG. 13 and 144 in FIG. 14 may also be said to lie in the x y plane but to be in the x direction along (which shall also mean, parallel to) the x axis in either a + or − sense. It should further be noted that the type of rotary movement in a forward vertical plane direction as indicated at 133 in FIG. 11, and the opposite type of rotary movement in a vertical plane as indicated at 136 in FIG. 12 may be said to be movements in the y z plane substantially around the x axis, while the type of rotary movement in a lateral vertical plane, as shown in one direction at 146 in FIG. 15 and in the opposite direction at 148 in FIG. 16, may be said to be movements in the x z plane substantially around the y axis. There is also a third and often less important (although not always so) type of rotary movement in the two directions shown by the directional arrow 138 in FIG. 6 and the directional arrow 140 in FIG. 7 which can be said to be rotation in the x y plane substantially around the z axis.

It should be clearly understood that the center of the workpiece 32 and consequently, the center of the workpiece holder 62, as is perhaps best shown at the imaginary upper workpiece vertical axis center point 156 in FIG. 17, may be said to have a workpiece upper vertical center axis portion 50U passing downwardly therethrough, which is parallel to, and forwardly offset from, the imaginary z axis of the coordinate axis frame of reference 154 by an exactly predetermined distance when in a centered or null position of the adjusting apparatus. It should also be noted, as is best shown in FIG. 1, that the rest of the workpiece apparatus (microscope optical system 34 and 36 as shown in FIG. 1) also has what might be termed a workpiece (optical in the example illustrated) lower vertical center axis portion 50L, the position of which is pre-existing when the upper workpiece (the upper eyepiece and objective lens portion of a microscope optical system generally indicated at 32 in FIG. 1) are mounted in the workpiece holder 62 which, initially, immediately after such mounting, may be found to be either displaced in a translatory manner or slightly rotated relative to the lower portion of the microscope optical system. In other words, at the time of initial mounting of the upper microscope lens system portion 32, its so-called workpiece (actually optical) vertical axis portion 50U may not be in exact alignment with the pre-existing so-called workpiece (actually optical in the case illustrated) lower vertical center axis portion 50L and it is the purpose of the present invention to bring about exact alignment of said upper optical axis portion 50U and said lower optical axis portion 50L, which is accomplished by the two kinds of translatory movement and two kinds of rotary movement shown in detail in the figures and previously described herein. When this occurs, the upper and lower optical axis portions 50U and 50L may be said to comprise a single line of collimation of the complete microscope, including all portions thereof, which is the major purpose of the novel positioning and aligning head of the present invention.

It should be noted that while the transverse plane rotary adjustment movement in the direction of the arrows 138 and 140 is not of primary importance in the particular alignment operation illustrated, it would be of great significance in any optical system having optical variations circularly angularly disposed around the vertical central axis of the optical system. Therefore, it can be an important adjustment feature in certain modifications.

It should be further noted that movement of the workpiece holder 62 in a third translatory direction parallel to the z axis (and usually forwardly offset therefrom) can be useful in certain cases, although it has nothing to do with the primary alignment function comprising vertical alignment of the upper and lower optical axis portions 50U & 50L. Thus, such vertical translatory movement is indicated by the double-headed arrow 137 in FIG. 17 and is made possible by loosening the knurled-knob locking screw 102 and then vertically slideably moving the rear dovetailed insert portion, or fastening element, 100 vertically in the undercut slideable groove-portion-defining angular surfaces 96 defined between the to connection part side rail dovetail connection edge members (portions) 82 and the front surface 98 of the coupling portion 58, after which, the knurled-knob locking screw 102 is again re-tightened to lock the vertically slideable insert member 100, and the attached workpiece holder 62, in whatever vertically adjusted position it has been moved to. This type of vertical translatory movement of the workpiece holder 62 can be either up or down and makes it possible to conveniently position the eyepiece portions 42 at a proper eye level for a person sitting in front of the entire apparatus and working with the microscope, especially if this is continued for a long period of time. This also makes it possible to compensate for different top positionings of such microscope eyepiece portions of different microscope optical systems which have different basic overall heights. Also, this makes it possible to adjust the objective lens portions, such as the one shown at 44, relative to a viewable object (sample) placed on the intermediate work stage 34 where the sample is of different height than preceding samples. This is in lieu of doing the adjustment by means of the lower focusing mechanism 38. Also, if the intermediate work stage 34 is too high (or too low) for the hands of an operator of the apparatus, it may correspondingly lowered (or raised) by adjusting the focusing mechanism 38 and this may be compensated for by vertically adjusting the workpiece holder 62 until a position providing both proper focusing and convenient physical positioning of the parts of the apparatus has been achieved, & all without disturbing the vertical alignment of 50U & 50L.

It should also be noted that while the type of movement-causing means specifically illustrated and described for exemplary purposes comprises multiple sets of force-opposed pairs of translatory movement-causing members, this it to be clearly understood as exemplary only because it should be quite apparent to those skilled in the art that various movement-causing structures for causing any or all of the types of adjusting and aligning movement referred to herein may be employed in lieu of the specific structures illustrated and described and all within the broad scope of the positioning and aligning concept of the present invention. Therefore, all such alternate and effectively functionally equivalent structures are intended to be included and comprehended within the scope of the present invention. All that has been said immediately above is also applicable to the attachment element structures and the connection parts which can be very readily modified within the basic spirit and scope of the present invention by the use of various functionally equivalent alternates and such are intended to be within the broad scope of the present invention.

It should be understood that the figures and the specific description thereof set forth in this application are for the purpose of illustrating the present invention and are not to be construed as limiting the present invention and the precise and detailed specific structures shown in the figures and specifically described hereinbefore. Rather, the real invention is intended to include substantially equivalent constructions embodying the basic teachings and inventive concept of the present invention.

What is claimed is:

1. Positioning apparatus for positioning a workpiece holder relative to a frame of reference, comprising: an adjustable positioning head including an attachment portion and an adjustably movable coupling portion having connection part means provided with fastening and connection means cooperable for connection to a workpiece holder, said attachment portion and said coupling portion being provided with controllably adjustable relative movement-causing means effectively interconnected therebetween in a manner such as to selectively and controllably cause relative movement of said coupling portion with respect to said attachment portion in mutually perpendicular planes and directions with respect to an imaginary reference center point of an imaginary frame of reference having imaginary mutually perpendicular x, y, and z axes, said movement-causing means effectively interconnected between said attachment portion and said coupling portion being controllably selectively operable to position a workpiece so as to be vertically centered upon, and so as to have a workpiece upper vertical center axis portion thereof centered upon, and vertically aligned with, and coincident with, a workpiece lower vertical center axis portion which is parallel to and forwardly offset from a vertical reference axis of said imaginary frame of reference by movement in two mutually perpendicular directions lying in a horizontal plane and coincident with the imaginary y axis of said imaginary frame of reference in one case and parallel to and offset from the imaginary x axis of said imaginary frame of reference in the other case; said movement-causing means being of a translatory extendable and retractable type for causing said movement in said two mutually perpendicular directions lying in a horizontal plane and coincident with the imaginary y axis and parallel to and offset from the imaginary x axis to be of a translatory type; said movement-causing means being also arranged to also selectively cause rotary movement of said coupling portion relative to said attachment portion in two mutually different perpendicular vertical planes around the imaginary x axis and the imaginary y axis of said imaginary frame of reference; said movement-causing means comprising a plurality of spaced translatory movement-causing means spaced apart so as to be on both sides of the imaginary center of said imaginary frame of reference and above and below said imaginary frame of reference whereby to be simultaneously and similarly controllably extended or retracted for causing either of said two different kinds of translatory movement and being cooperable for unequal extension or retraction or partial extension and partial retraction for causing any of said types of rotary movement in said two different vertical planes as desired and needed for aligning a workpiece upper vertical center axis portion, when held by a workpiece holder, with a pre-existing workpiece lower vertical center axis portion parallel to and forwardly offset from an imaginary vertical reference axis of said imaginary frame of reference.

2. Positioning apparatus for positioning a workpiece holder relative to a frame of reference, comprising: an adjustable positioning head including an attachment portion and an adjustably movable coupling portion having connection part means provided with fastening and connection means cooperable for connection to a workpiece holder, said attachment portion and said coupling portion being provided with controllably adjustable relative movement-causing means effectively interconnected therebetween in a manner such as to selectively and controllably cause relative movement of said coupling portion with respect to said attachment portion in mutually perpendicular planes and directions with respect to an imaginary reference center point of an imaginary frame of reference having imaginary mutually perpendicular x, y, and z axes, said movement-causing means effectively interconnected between said attachment portion and said coupling portion being controllably selectively operable to position a workpiece so as to be vertically centered upon, and so as to have a workpiece upper vertical center axis portion thereof centered upon, and vertically aligned with, and coincident with, a workpiece lower vertical center axis portion which is parallel to and forwardly offset from a vertical reference axis of said imaginary frame of reference by movement in two mutually perpendicular directions lying in a horizontal plane and coincident with the imaginary y axis of said imaginary frame of reference in one case and parallel to and offset from the imaginary x axis of said imaginary frame of reference in the other case; said movement-causing means comprising a plurality of pairs of effectively force-opposing translatory movement-causing members coupled in opposition between said attachment portion and said coupling portion whereby to apply translatory force in opposite directions to multiple corresponding parts of the coupling portion connected thereto for both translatory adjusting purposes and final adjusted-position locking purposes; said plurality of translatory movement-causing members also including a first portion thereof directly interconnected between said attachment portion and said coupling portion at multiple spaced locations on each side of and above and below said imaginary center of said imaginary frame of reference and also includes a second portion directly interconnected between said coupling portion and said connection part means at multiple locations spaced on each side of and above and below the imaginary center of said imaginary frame of reference for effectively separating the two kinds of translatory movement in the y and x directions for accomplishment by said different first and second portions of said translatory movement-causing members and also for correspondingly effectively separating said two different kinds of rotary movement in said two different mutually perpendicular vertical planes from each other.

3. Positioning apparatus as defined in claim 1, wherein said attachment portion is provided with controllably engagable and disengagable attachment elements cooperable for positive locking engagement and attachment of said attachment portion with respect to an auxiliary supporting structure.

4. Positioning apparatus as defined in claim 1, wherein said attachment portion is provided with controllably engagable and disengagable attachment elements cooperable for positive locking engagement and attachment of said attachment portion with respect to an auxiliary supporting structure taking the form of a substantially horizontally-directed upper cantilever supporting arm portion of a microscope stand.

5. Positioning apparatus as defined in claim 1, wherein said connection part means comprises connection parts provided with fastening and connection means cooperable for fastening cooperation with a corresponding fastening element at the rear base of said workpiece holder.

6. Positioning apparatus as defined in claim 1, including said workpiece holder having a recess-defining portion defining a central workpiece-mounting, vertically directed, receiving recess through which a workpiece is adapted to be vertically extended for intended alignment of said workpiece upper vertical center axis portion thereof and said coincident workpiece lower vertical center axis portion thereof which is parallel to and forwardly offset from said vertical reference axis of said imaginary frame of reference.

7. Positioning apparatus as defined in claim 6, wherein said connection part means comprises connection parts provided with dovetail, undercut groove fastening and connection means cooperable for fastening cooperation with a corresponding edge-tapered dovetail-cooperable fastening element provided at the rear base end of said workpiece holder.

8. Positioning apparatus as defined in claim 7, which is further provided with locking means for rigidifying and locking said fastening element of said workpiece holder in firmly non-movably mounted relationship to the connection parts of said positioning head whereby to mount a workpiece comprising an upper eyepiece and objective lens portion of a microscope optical system and a vertically-directed rigid manner with respect to an auxiliary supporting structure taking the form of an upper supporting cantilever arm portion of a microscope stand while providing for selectively controllably adjustable translatory movement of two different mutually perpendicular types and in four different directions and while providing for rotary movement in two different mutually perpendicular vertical planes and in four different directions as required in order to shift the workpiece holder and a workpiece adapted to be carried thereby, into a position such as to provide perfect vertical alignment and coincidence of a workpiece upper vertical center axis portion thereof and a corresponding workpiece lower vertical center axis portion thereof which is parallel to and forwardly offset to an exactly predetermined extent from the corresponding imaginary vertical axis of the imaginary frame of reference.

9. Positioning apparatus as defined in claim 8, wherein said workpiece holder is further provided with controllably operable locking means for locking engagement with respect to an exterior portion of a vertically-directed longitudinal workpiece when mounted within said recess-defining portion of said workpiece holder.

10. Positioning apparatus as defined in claim 4, wherein said controllably engagable and disengagable attachment elements of said attachment portion comprise microscope stand upper cantilever supporting-arm-engagable-and disengagable attachment members cooperable for positive locking engagement and attachment of said attachment portion with respect to such a horizontally-directed upper cantilever supporting arm portion of a microscope stand.

11. Positioning apparatus as defined in claim 6, wherein said recess-defining portion of said workpiece holder comprises a mounting ring for snugly receiving and mounting a circular exterior portion of a specific type of longitudinal workpiece taking the form of a first portion of a microscope optical system having a vertically-directed longitudinal central optical axis which is intended to be alinged with, and made exactly coincident with, the vertical working optical axis of the rest of a microscope carried by and comprising a part of a microscope stand mounting said attachment portion on a substantially horizontally-directed upper cantilever supporting arm portion thereof, with said second-mentioned optical axis being parallel to and forwardly offset to an exactly predetermined extent from the corresponding imaginary vertical axis of the imaginary frame of reference.

12. Positioning apparatus as defined in claim 11, wherein said workpiece holder is also provided with and positively includes an edge-tapered, dovetail-cooperable fastening element at a rear base mounting end of said workpiece holder.

13. Positioning apparatus as defined in claim 1, including said workpiece holder adapted to be effectively carried by said coupling portion by way of said connection part means, and wherein said movement-causing means is of said translatory extendable and retractable type for causing said movement in said two mutually perpendicular directions lying in a horizontal plane and coincident with the imaginary y axis and parallel to and offset from the imaginary x axis to be of a translatory type, said movement-causing means being arranged to also selectively cause said rotary movement of said coupling portion relative to said attachment portion in said two mutually different perpendicular vertical planes around the imaginary x axis and the imaginary y axis of said imaginary frame of reference, said movement-causing means being also provided with additional controllably operable translatory movement-causing means arranged to cause controllably adjustable relative movement between said workpiece holder and said connection part means in another direction mutually perpendicular to said previously-mentioned mutually perpendicular x and y directions and, in the latter case, lying in a vertical plane parallel to, and forwardly offset from, the imaginary z axis.

14. Positioning apparatus as defined in claim 13, wherein said additional translatory movement-causing means comprises vertical positioning adjustment means connected between said connection part means and said workpiece holder and operable when unlocked to provide for vertical translatory movement of said workpiece holder relative to said connection part means and consequently, relative to said coupling portion and said attachment portion, in a z axis direction substantially parallel to and forwardly offset from the imaginary z axis.

* * * * *